United States Patent
Onose et al.

(10) Patent No.: US 7,128,621 B2
(45) Date of Patent: Oct. 31, 2006

(54) CONNECTING STRUCTURE AND ITS CONNECTING METHOD, AND ROTATING MACHINERY AND ALTERNATING CURRENT

(75) Inventors: Shin Onose, Naka (JP); Katsuyoshi Terakado, Urizura (JP); Fuminori Ishikawa, Hitachiota (JP); Masamichi Kase, Hitachi (JP); Masaki Okamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/921,095

(22) Filed: Aug. 19, 2004

(65) Prior Publication Data

US 2005/0020147 A1 Jan. 27, 2005

Related U.S. Application Data

(63) Continuation of application No. 10/247,762, filed on Sep. 20, 2002, now abandoned.

(30) Foreign Application Priority Data

Jan. 15, 2002 (JP) .............................. 2002-005730

(51) Int. Cl.
 *H01R 4/02* (2006.01)
(52) U.S. Cl. ..................................... 439/874; 219/91.21
(58) Field of Classification Search ................ 439/874, 439/875; 219/91.21, 56.21, 56.22, 85.18
See application file for complete search history.

(56) References Cited

U.S. PATENT DOCUMENTS

| 3,277,268 A * | 10/1966 | Rees et al. ..................... 219/92 |
| 4,154,430 A * | 5/1979 | Pfarr, Jr. ....................... 256/10 |
| 5,245,240 A * | 9/1993 | Takasaki ..................... 310/237 |
| 5,264,674 A * | 11/1993 | Mangan et al. ........... 219/56.22 |
| 5,308,948 A * | 5/1994 | Kawagoe et al. ............ 219/110 |
| 5,547,122 A * | 8/1996 | Smeggil et al. .......... 228/173.3 |
| 5,914,546 A | 6/1999 | Terakado et al. |
| 5,954,549 A * | 9/1999 | Shinchi ...................... 439/874 |
| 6,135,829 A * | 10/2000 | Johnston ..................... 439/874 |
| 6,261,135 B1 * | 7/2001 | Shinchi ...................... 439/874 |
| 6,326,580 B1 * | 12/2001 | Hiiro .......................... 219/110 |
| 6,744,161 B1 * | 6/2004 | Murata et al. ................ 310/71 |
| 6,759,594 B1 * | 7/2004 | Iijima et al. ................ 174/135 |
| 6,896,562 B1 * | 5/2005 | Takizawa et al. ........... 439/874 |

FOREIGN PATENT DOCUMENTS

| DE | 19618104 | 11/1997 |
| DE | 19731885 | 1/1999 |
| DE | 10018301 | 10/2001 |
| JP | 02137306 | 5/1990 |
| JP | 03152884 A | 6/1991 |
| JP | 05114450 | 5/1993 |
| JP | 05300688 A | 11/1993 |

(Continued)

*Primary Examiner*—Gary F. Paumen
(74) *Attorney, Agent, or Firm*—Crowell & Moring LLP (57) ABSTRACT

A connecting structure in which the electric cable having an insulated coating and the electrically conductive member with non-insulated coating are connected through a connecting terminal having a junction support member by applying an electric current, heating and applying a pressure; and the electric cables having an insulated coating and are connected mutually to one another through a connecting terminal having an electrically conductive member with non-insulated coating and a junction support member by applying an electric current, heating and applying a pressure, and a connecting method in which those connections are established by applying an electric current, applying a heat and applying a pressure, and a rotating electric machinery having that connecting structure and an alternating current generator using this machinery.

4 Claims, 8 Drawing Sheets

FOREIGN PATENT DOCUMENTS

| | | |
|---|---|---|
| JP | 08138821 A | 5/1996 |
| JP | 11114674 A | 4/1999 |
| JP | 2000341912 A | 12/2000 |
| JP | 2001231233 A | 8/2001 |

* cited by examiner

CONNECTING STRUCTURE AND ITS CONNECTING METHOD, AND ROTATING MACHINERY AND ALTERNATING CURRENT

This application is a continuation of application Ser. No. 10/247,762, filed Sep. 20, 2002 now abandoned.

BACKGROUND OF THE INVENTION

The present invention relates to a new connecting structure and its connection method, and to a rotating electrical machinery having the above connecting structure and an alternating current generator using this rotating electrical machinery.

Conventionally, the connecting method for the cable having an insulated coating for the electrical machinery includes the insulated coating of the electric cable having the insulated coating is removed by a mechanical or chemical method, and the electric cable with its metallic surface being exposed is made wound around the electrically conductive member.

As for the connecting method for connecting directly the electric cable to the electrically conductive member without removing the insulated coating of the electric cable having the insulated coating, using a U-shaped electrically conductive member and inserting an electric cable having a insulated coating into the depression part of the U-Shaped electrically conductive member, and pressing the electric cable with the electrode for resistance welding and applying the electric current, then the electrically conductive member and the electrode generate heat. In this method, due to the generated heat, the insulated coating is made soften and flow out, and then the electric cable having the insulated coating and the electrically conductive member are connected. In addition, there is another prior known in Japanese Patent Laid-Open Number 2-137306 (1990). In this official information, what is disclosed is a method for connecting the coils with the heat at the connecting terminal developed by the heat generated by applying the electric current into the resistance. Those methods for connecting the cable is effective because the step for removing the coating can be omitted.

In the connecting method in which the coating is mechanically removed, however, it is difficult to remove the coating completely and constantly and the electric cable having the insulated coating may be damaged, which leads to the reduction in the cross-section of the electric cable and hence the reduction in the reliability for connecting strength. The chemical connecting method gives a great effect to safety and environmental issues, and the solder-based connecting method has such a problem that the mechanical strength is reduced in a high temperature, both of which leads to reduction in the reliability. In addition, in such a connecting method as the coating is not removed and the connecting support member is not used, only the electric cable and the electrically conductive member contact mechanically to each other but the metallic contact is not established. Though the electrical connectivity is guaranteed by caulking the electrically conductive member, there found such a problem in the electrical characteristic and the strength reliability because the caulking strength is reduced due to vibration or heat cycle.

In order to solve the above problems in the above official report, a connecting support member is installed in the connecting terminal formed in U-shape and the electric cable having the insulated coating is inserted and pressed and then the electric cable and the electrically conductive member are made connected to each other by the resistance heat generated at the connecting terminal with an electric current being applied.

However, as what is inserted in the terminal formed in U-shape or in a round form is the electric cable having the insulated coating, the applied electric current is concentrated at the bending or curvature part and thus there is such a problem that this part is overheated, melt down or buckled. In order to solve this problem, it is required to make the cross-section large enough to stay with the applied electric current, and consequently to make the size of the electrically conductive member large enough. Therefore, in the connecting method in which the electric cable having the insulated coating is connected to the electrically conductive member by using the conventional connecting support member, it is required to consider the shape and material of the electrically conductive member in compliance with the wire diameter of the electric cable having the insulated coating.

SUMMARY OF THE INVENTION

An object of the present invention is to provide an electric cable having an insulated coating and an electrically conductive member arranged side by side respectively to contact the face service of a contacting terminal, with a junction support member being provided.

The electric cable and the conductive member are subject to the application of an electric current, heat and pressure through an electrode of resistance welding in a direction in which the electric cable with the insulated coating and the electrically conducted member do not overlap.

According to the present invention an electric current flows into the conductive member and a connecting terminal and subsequently the electrically conductive member and the connecting terminal generate heat. This heat softens the insulating coating of the electric cable. Subsequently, the softened coating is pressurized so that the junction support member can be fused with the result that the electric cable with the insulating coating and the electrically conducted member as well as the connecting terminal are metallically connected or are welded.

It is a further object of the present invention that during the application of the current comes through the electrically conducted member, the local heating of the connecting terminal is prevented so that the whole connecting terminal is heated uniformly.

Because of the homogeneous heating, the softening and the discharge of the insulated coating of the electric cable can be carried out effectively.

Another feature of the present invention, the connecting terminal is U-shaped so that both the electric current applications and the heating applications take place on the U-shaped connecting terminal to once again provide for a softening and discharge of the insulating coating in an effective manner.

According to the present invention because the pressure application and the electric current application are performed in a direction in which the cable and the conductive member do not overlap, the electric cable having the insulated coating and the conductive member are connected to each other using a flat plate shape connecting terminal. the conductive member do not overlap, the electric cable having the insulated coating and the conductive member are connected to each other using a flat plate shape connecting terminal.

An object of the present invention is to provide a connecting structure and its connecting method enabling to connecting metallically the electric cable having the insulated coating and the electrically conductive member without removing the insulated coating of the electric cable having the insulated coating and for preventing the local heat generation, and to provide an rotating machinery having this connecting structure and an alternating current generator using this machinery.

In the connecting method of the present invention for connecting the electric cable having the insulated coating and the electrically conductive member, the electric cable having the insulated coating and the electrically conductive member are arranged so that those may connect individually to the connecting terminal at the edge face where the connecting support member is installed. Those are pressed with the electrode formed by resistance welding and the electric current is applied, and then the electric current flows into the electrically conductive member and the connecting terminal, and the heat is generated individually at the electrically conductive member and the connecting terminal. The generated heat makes the insulated coating of the electric cable having the insulated coating soften and removed. Subsequently, the electric cable having the insulated coating and the electrically conductive member, and the connecting terminal are connected metallically with the connecting support member being melt down, which is the specific feature of the present invention.

In the present invention, by means that the electrically conductive member is arranged so as to be adjacent to the electric cable having the insulated coating, the local heat generation is prevented when applying the electric current into the electrically conductive member for the process of applying the electric current, heating and pressing the members, and consequently, the whole of the connecting terminal is enabled to be heated uniformly. Therefore, the electrically conductive member is either a non-insulated electric cable or an external connecting terminal of the primary electric machinery, and another electric conductive member for heating is prepared independently of those cables and terminals.

In the present invention, the electric cable having the insulated coating and the electrically conductive member are inserted in parallel into the connecting terminal having the connecting support member in advance in its U-shaped and round-formed inside surface, and then the press is applied so that the electric cable having the insulated coating and the electrically conductive member may contact individually to the connecting terminal. And next, applying the electric current, the electric current flows in the bending part of the connecting terminal and the electrically conductive member. At this point, the electrically conductive member and the connecting terminal generate heat, and the generate heat softens and removes the insulated coating of the electric cable having the insulated coating, which results in the metallic connection between the insulated coating of the electric cable having the insulated coating and the electrically conductive member by the connecting support member. As the electrically conductive member is arranged at the open port side of the connecting terminal having the connecting support member in advance in its U-shaped and round-formed inside surface, the heat generated at the bending part of the connection terminal and the electrically conductive member transfers to the electric cable having the insulated coating and thus spreads uniformly over the whole part of the connecting terminal by the heat conduction at both sides.

And furthermore, in order to connect plural electric cables having the insulated coating to the electrically conductive member, all the electric cables having the insulated coating is arranged in parallel or in staggered lattice so as to contact to the connecting terminal, and the electrode presses the electrically conductive member and applies the electric current while making the electrically conductive member contact to the connecting terminal.

By means of the connecting structure and the connecting method of the present invention, it will be appreciated that the electrically conductive member and the connecting terminal can be downsized, and further that the connecting quality can be stabilized.

The cross-sectional shape of each of the electric cable having the insulated coating and the electrically conductive member is preferably either a round form, a rectangular form or a polygon form; in the junction process, the electric cable having the insulated coating and the electrically conductive member contact to the connecting terminal preferably by the applied pressure to the junction electrode for the resistance welding or by the molding process in the preprocessing; the electric current is preferably applied separately to the bending part of the connecting terminal and to the electrically conductive member in order to prevent the localized heat generation and to heat uniformly the connecting part; the junction support member of the connecting terminal is preferably brazing filler metal or solder, or selected from metals having a melting point lower than the material for the connecting terminal, and these metals are processed in metal plating; the material for the connecting terminal is preferably selected from copper, copper alloy, iron, iron alloy, aluminum or aluminum alloy; and a U-shaped groove or a ring is preferably formed at one side or both sides of the top edge of the electrode in order to prevent the displacement between the electric cable having the insulated coating and the electrically conductive member, and the connecting terminal in the junction process.

As for the brazing filler metal in the present invention, phosphor copper braze including P 3–4%, Ag 4–17% and Cu for the rest part in weight fraction or JIS silver braze class Bag-1, 2 or 7 can be used.

In a specific example of the present invention, in an alternating current generator for the rolling stocks or the construction machines having a stator core having the stator coil and the rectifier apparatus, a rotor having a shaft around which the magnetic field coil is wound and enabled to rotated in the stator core, and a connecting terminal for supplying an electric current to said magnetic field coil through a slip ring and for connecting the terminal of said magnetic field coil to a lead line of the slip ring, each located between the end frame, wherein said magnetic field coil is an electric cable having an insulated coating; the lead line of the slip ring is a non-insulated coating electrically conductive member; the lead line to said magnetic field coil and the slip ring or the said stator coil is an electric cable having an insulated coating; the terminal of said rectifier apparatus is a non-insulated coating electrically conductive member; and said stator coil and said terminal is connected by either of said connecting structure or either of said connecting method.

In addition, the alternating current generator of the present invention is characterized as having such a specific structure, having said specific connecting structure that said connecting terminal and said slip ring are pressed and fixed by a resin pressed into said shaft,

BRIEF DESCRIPTION OF DRAWINGS

FIG. 2(a) is a perspective view illustrating the connecting structure of the electric cable having the insulated coating and the electrically conductive member, FIG. 2(b) a cross-sectional view illustrating the process of heating and applying the electric current, and FIG. 2(c) a cross-sectional view of the connecting structure, in the embodiment 2, respectively.

DESCRIPTION OF THE PREFERRED EMBODIMENTS (Embodiment 1)

Figure 1:
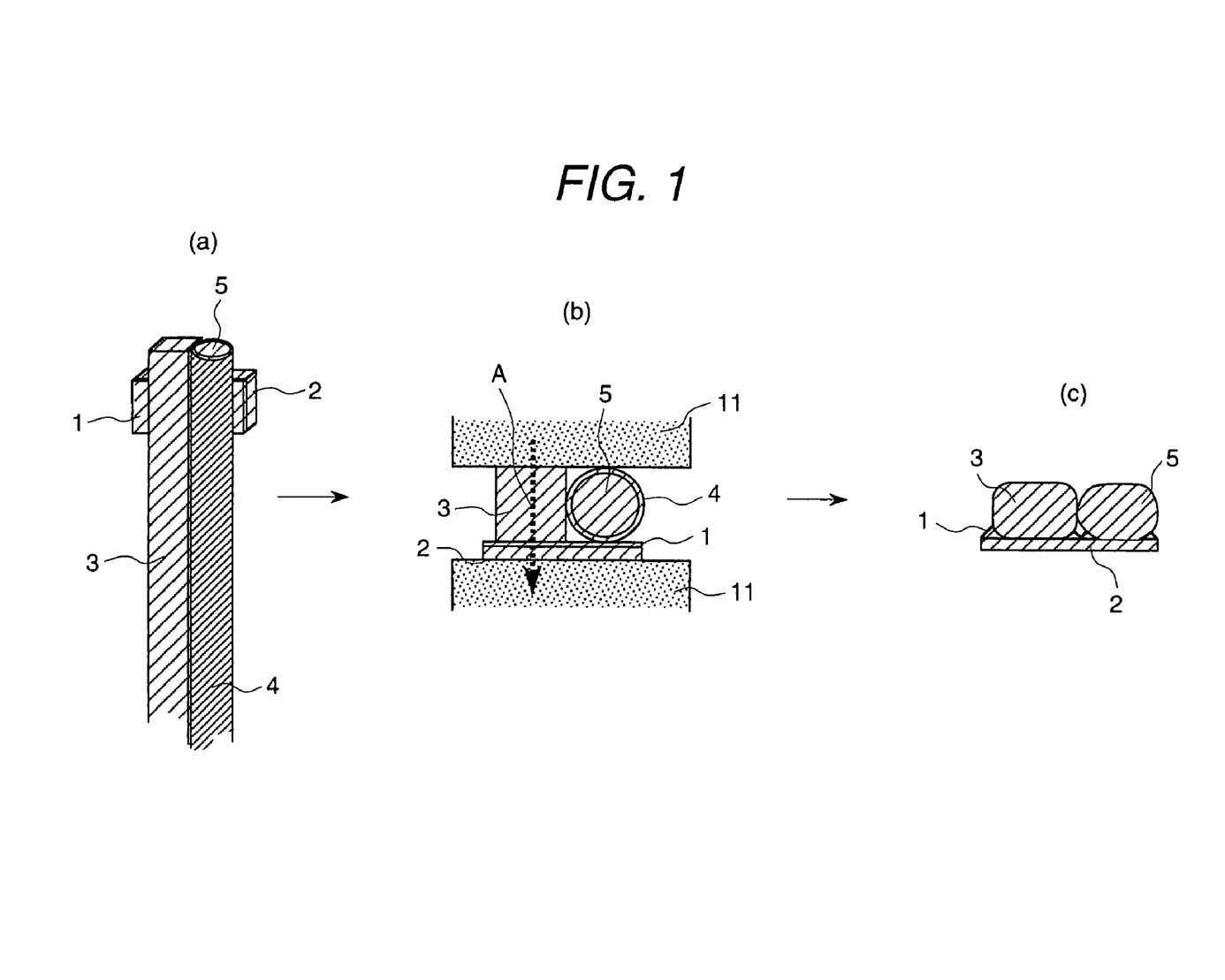
FIG. 1(a) is a perspective view illustrating the connecting structure of the electric cable having the insulated coating and the electrically conductive member.
FIG. 1(b) is a cross-sectional view illustrating the process of heating and applying the electric current.
FIG. 1(c) is a cross-sectional view of the connecting structure, in the embodiment 1, respectively.

In this embodiment, as shown in FIG. 1(a), the electric cable 5 having the insulated coating and the electrically conductive member 3 are arranged on the connecting terminal 2 on which the junction support member 1 is installed in advance. Next, as shown in FIG. 1(b), the electrode 11 for the resistance welding applies the press. At this point, the electric cable 5 having the insulated coating, the electrically conductive member 3 and the connecting terminal 2 are pressed so as to contact to the electrode 11. After that, applying the electric current to the electrode 11, the electric current A flows through the electrically conductive member 3, and then the electrode 11, the electrically conductive member 3 and the junction support member 1 generates heat. Owing to this heat generation, the insulated coating 4 gets soften, and is removed by the applied pressure of the electrode 11, and then the electric cable 5 having the insulated coating and the electrically conductive member 3 are connected to each other by the junction support member 1 as shown in FIG. 1(c). The material used for the electric cable 5, the electrically conductive member 3 and the connecting terminal 2 is copper. In addition, the junction support member 1 is 0.07 mm thickness phosphor copper braze (P 5%, Ag 15% and Cu 80% in weight fraction) on one side of the copper plate of the connecting terminal 2 formed by surface cladding.

In this embodiment, the connecting terminal 2 is a flat plate, by which the electric cable 5 having the insulated coating is heated with the heat generated at the electrically conductive member 3, and then the insulated coating formed on the surface of the electric cable is carbonized or soften as well as the brazing filler metal is melted down which spreads over the mutual junction surfaces and establishes the junction state.

(Embodiment 2)

In this embodiment, as shown in FIG. 2(a), the electric cable 5 having the insulated coating and the electrically conductive member 3 are inserted in parallel into the connecting terminal 2 having the junction support member 1 in advance in its U-shaped inside surface.

Figure 2:
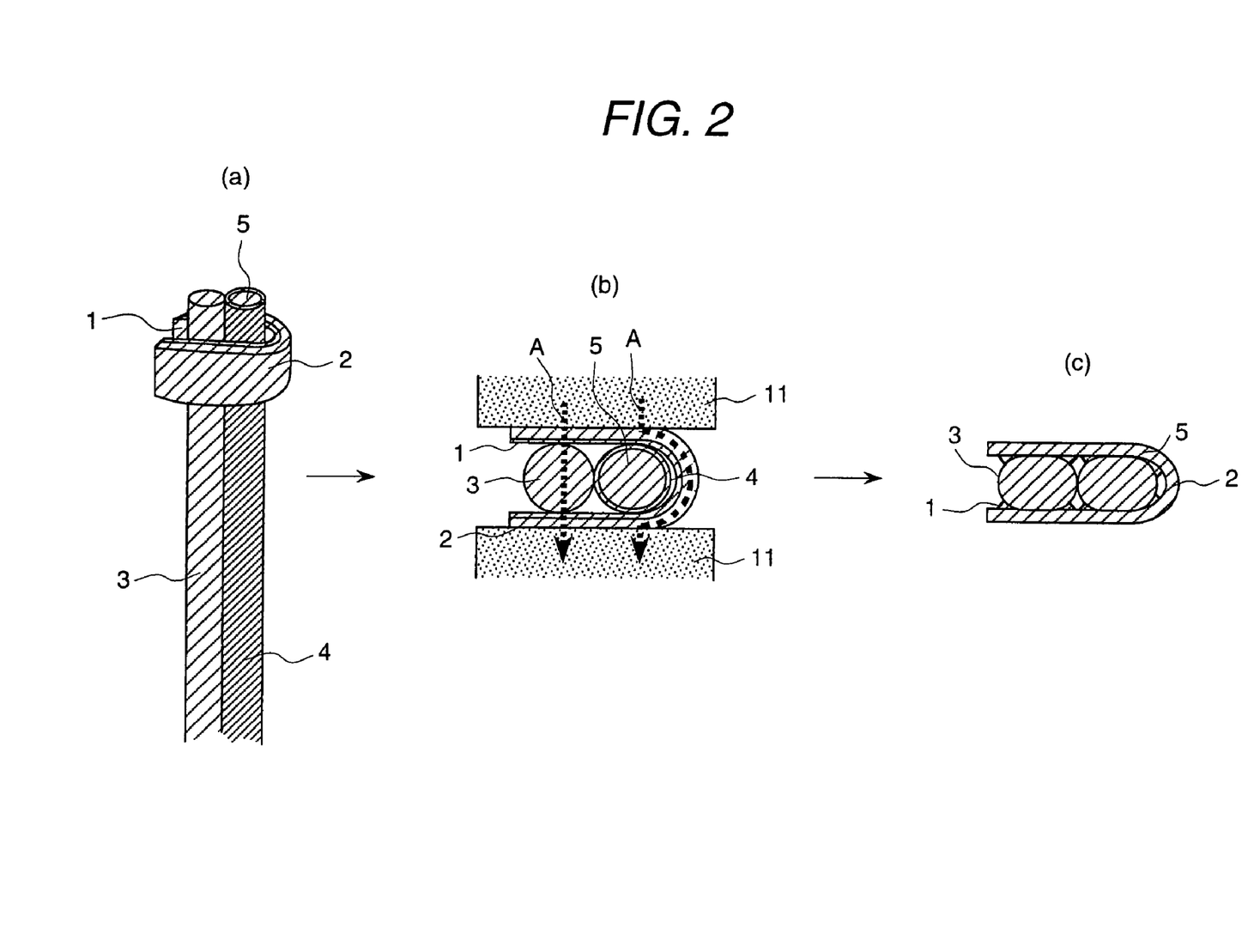

In this process, it is preferable that the electrically conductive member 3 is arranged at the open port side of the connecting terminal 2. Next, as shown in FIG. 2(*b*), the electrode 11 for the resistance welding presses the electric cable 5 having the insulated coating and the electrically conductive member 3 so as to contact individually to the opposed surface of the connecting terminal 2 formed in U-shape. After that, applying the electric current to the electrode 11, the electric current A flows through the bending part of the connecting terminal 2 formed in U-shape and the electrically conductive member 3. As this electric current flows separately in two parts, the electric current is not localized in the bending part of the connecting terminal 2 formed in U-shape but can heat the overall part of the connecting structure, and thus, the thickness and the width of the connecting terminal 2 can be reduced which leads to the minimization of the size of the connecting part. Owing to this electric current, the electrode 11, the U-shaped bending part of the connecting terminal 2, the electrically conductive member 3 and the junction support member 1 generate heat. Owing to this heat generation, the insulated coating 4 gets soften, and is removed by the applied pressure of the electrode 11, and then the electric cable 5 having the insulated coating and the electrically conductive member 3 are connected to each other by the junction support member 1 as shown in FIG. 2(*c*). In this embodiment, the connecting terminal 2 and the junction support member 1 are the same as in the embodiment 1.

In this embodiment, though the U-shaped connecting terminal with the junction support member cladded on its surface is used, it is allowed that, even using the U-shaped connecting terminal without the junction support member cladded on its surface, any thermoplastic material used for the insulated coating resin may be removed by the heat generated by the applied electric current and by the applied pressure in order to establish the junction state. This kind of connecting structure can be applied similarly to the following embodiments.

(Embodiment 3)

Figure 3:
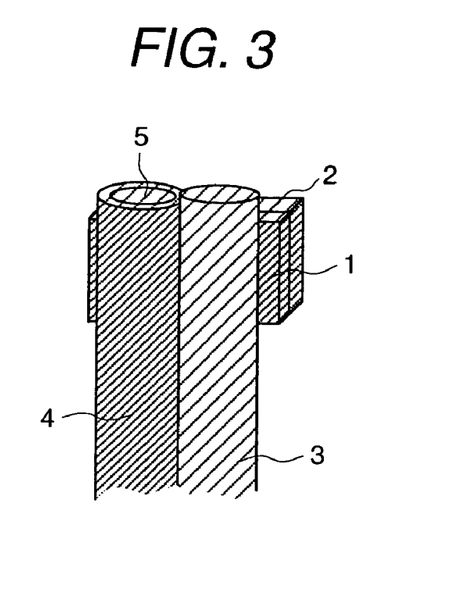
FIG. 3 is a perspective view illustrating the connecting structure of the electric cable having the insulated coating and the electrically conductive member in the embodiment 3.
Figure 4:
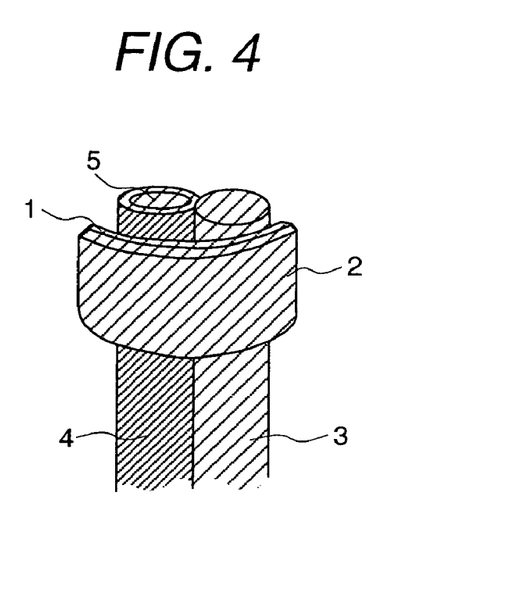
FIG. 4 is a perspective view illustrating the connecting structure of the electric cable having the insulated coating and the electrically conductive member in the embodiment 3.
Figure 5:
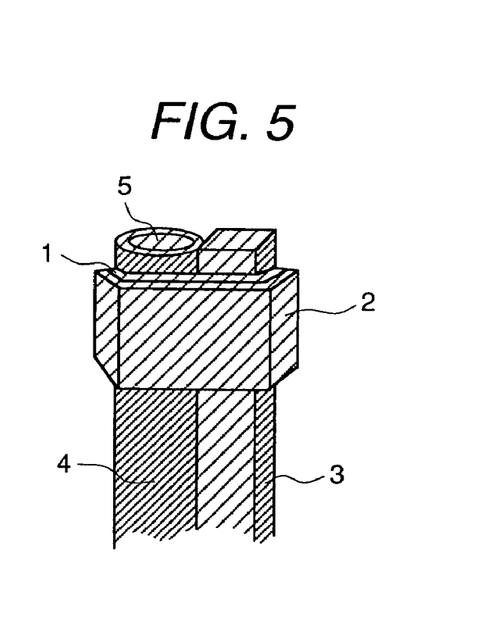
FIG. 5 is a perspective view illustrating the connecting structure of the electric cable having the insulated coating and the electrically conductive member in the embodiment 3.

In this embodiment, the electrically conductive member 3 is shaped in a round form as shown in FIG. 3, the connecting terminal 2 is shaped in an arched form as shown in FIG. 4, and the connecting terminal 2 is shaped in an rectangular open channel formed as shown in FIG. 5. This embodiment can establish the same junction state as the method shown in the embodiment 1, and provides the same effect.

(Embodiment 4)

Figure 6:
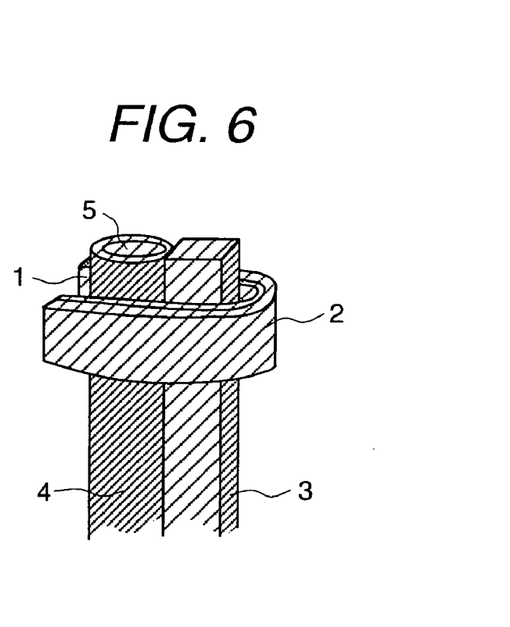
FIG. 6 is a perspective view illustrating the connecting structure of the electric cable having the insulated coating and the electrically conductive member in the embodiment 4.
Figure 7:
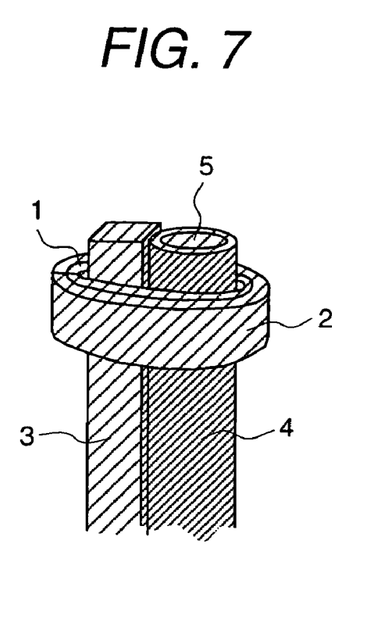
FIG. 7 is a perspective view illustrating the connecting structure of the electric cable having the insulated coating and the electrically conductive member in the embodiment 4.
Figure 8:
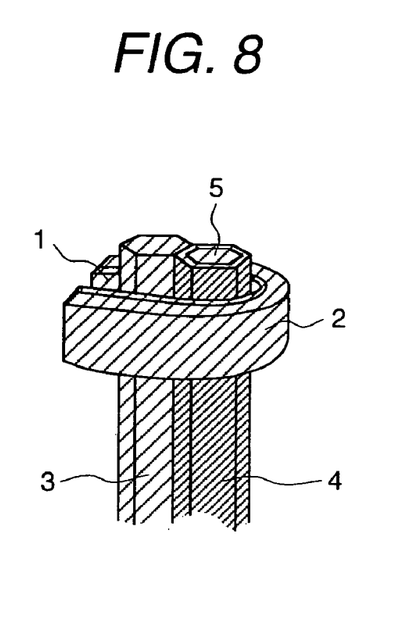
FIG. 8 is a perspective view illustrating the connecting structure of the electric cable having the insulated coating and the electrically conductive member in the embodiment 4.
Figure 9:
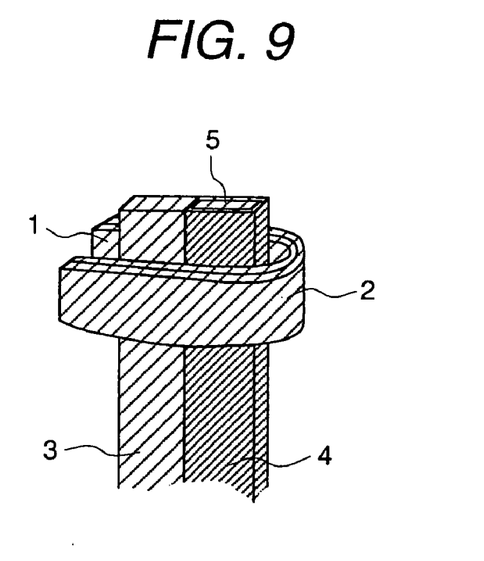
FIG. 9 is a perspective view illustrating the connecting structure of the electric cable having the insulated coating and the electrically conductive member in the embodiment 4.

In this embodiment, the electrically conductive member 3 is arranged at the bending part side of the U-shaped connecting terminal 2 as shown in FIG. 6, the open port side of the U-shaped connecting terminal is closed and shaped in a closed circle as shown in FIG. 7, the cross-section of the electric cable 5 having the insulated coating and the electrically conductive member 3 is shaped in a polygon as shown in FIG. 8, and the cross-section of the electric cable 5 having the insulated coating and the electrically conductive member 3 is shaped in a quadrangle as shown in FIG. 9. In either case, this embodiment can establish the same junction state as the method shown in the embodiment 2, and provides the same effect.

(Embodiment 5)

Figure 10:
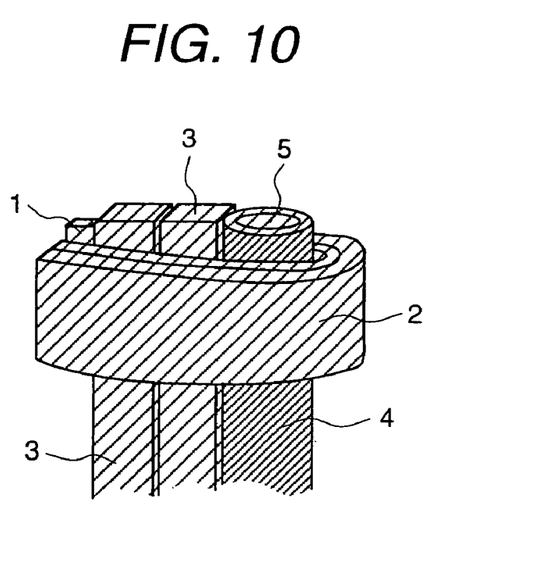
FIG. 10 is a perspective view illustrating the connecting structure of the electric cable having the insulated coating and the electrically conductive member in the embodiment 5.
Figure 11:
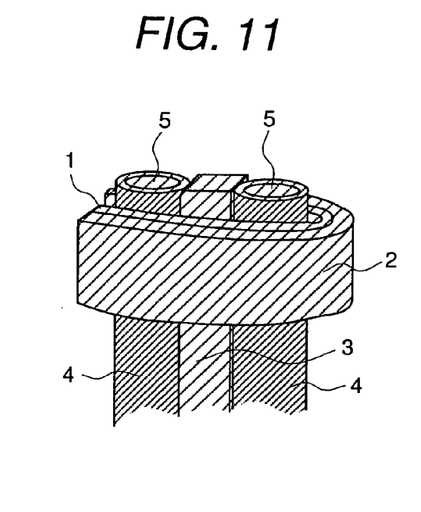
FIG. 11 is a perspective view illustrating the connecting structure of the electric cable having the insulated coating and the electrically conductive member in the embodiment 5.
Figure 12:
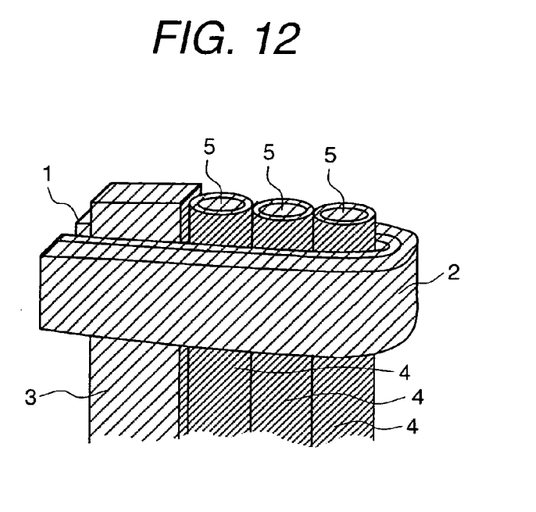
FIG. 12 is a perspective view illustrating the connecting structure of the electric cable having the insulated coating and the electrically conductive member in the embodiment 5.

In this embodiment, plural electric cables 5 having the insulated coating and/or plural electrically conductive members 3 are arranged in the U-shaped connecting terminal 2 as shown in FIGS. 10 to 12. This embodiment can also establish the same junction state as the method shown in the embodiment 2, and provides the same effect.

(Embodiment 6)

Figure 13:
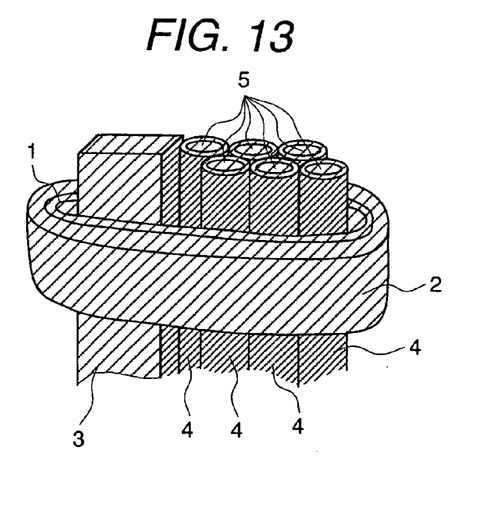
FIG. 13 is a perspective view illustrating the connecting structure of the electric cable having the insulated coating and the electrically conductive member in the embodiment 6.

In this embodiment, the electrically conductive member 3 and plural electric cables 5 having the insulated coating are arranged in the connecting terminal 2 shaped in a closed-circle so as to contact to the connecting terminal 2 as shown in FIG. 13. This embodiment can also establish the same junction state as the method shown in the embodiment 2, and provides the same effect.

(Embodiment 7)

Figure 14:
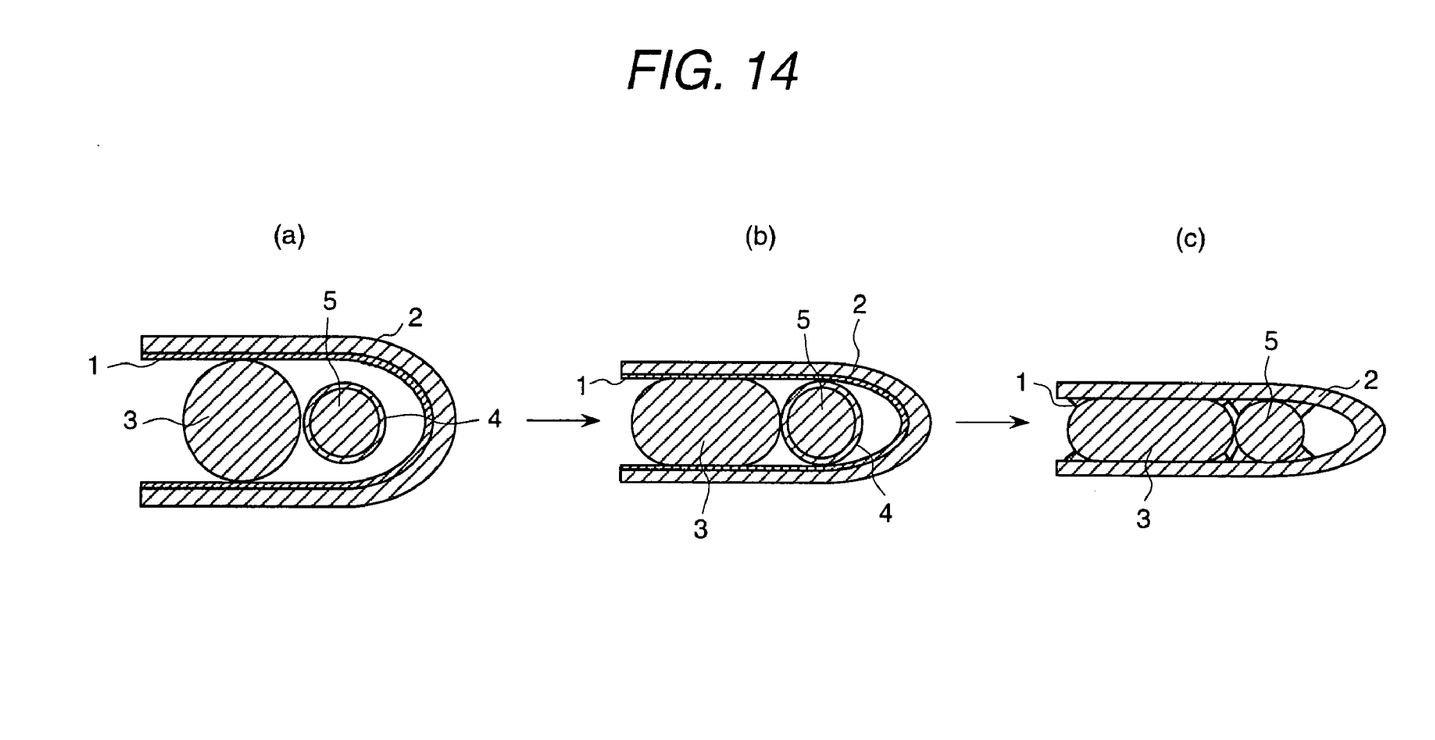
FIG. 14 is a perspective view illustrating the connecting structure of the electric cable having the insulated coating and the electrically conductive member in the embodiment 7.

In this embodiment, the electric cables 5 having the insulated coating and the electrically conductive member 3 with their sizes being different from each other are arranged so that the smaller one in size may contact directly to the connecting terminal 2 as shown in FIG. 14. This embodiment can also establish the same junction state as the method shown in the embodiment 2, and provides the same effect.

(Embodiment 8)

Figure 15:
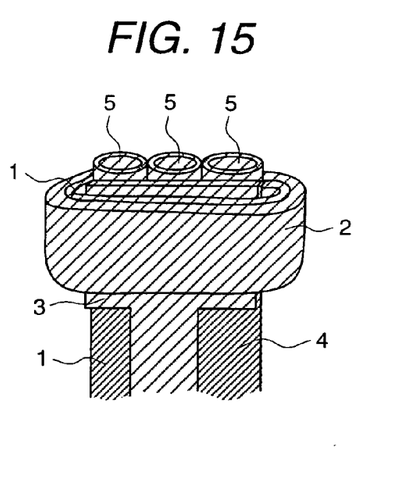
FIG. 15 is a perspective view illustrating the connecting structure of the electric cable having the insulated coating and the electrically conductive member in the embodiment 8.

In this embodiment, the electrically conductive member 3 and plural electric cables 5 having the insulated coating are arranged in the connecting terminal 2 shaped in a closed-circle so as to contact to the connecting terminal 2 as shown in FIG. 15. This embodiment can also establish the same junction state as the method shown in the embodiment 2, and provides the same effect.

(Embodiment 9)

Figure 16:
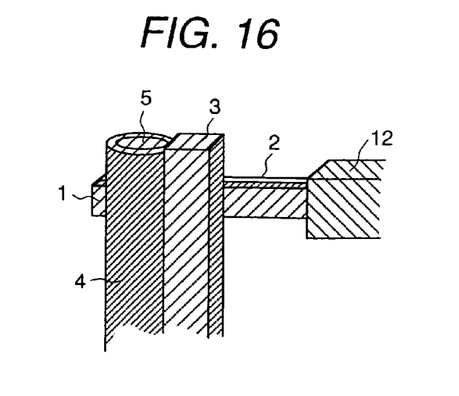
FIG. 16 is a perspective view illustrating the connecting structure of the electric cable having the insulated coating and the electrically conductive member in the embodiment 9.

In the connection structure of this embodiment, one end of the connecting terminal 2 is mounted and fixed at the resin 12 as shown in FIG. 16. This embodiment can also establish the same junction state as the method shown in the embodiment 1, and provides the same effect.

(Embodiment 10)

Figure 17:
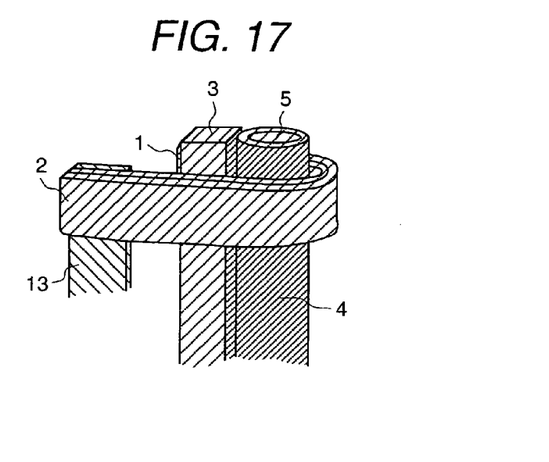
FIG. 17 is a perspective view illustrating the connecting structure of the electric cable having the insulated coating and the electrically conductive member in the embodiment 10.

In the connection structure of this embodiment, one end of the connecting terminal 2 is fixed at the fixed terminal 13 by the resistance welding or screws as shown in FIG. 17. This embodiment can also establish the same junction state as the method shown in the embodiment 2, and provides the same effect.

(Embodiment 11)

Figure 18:
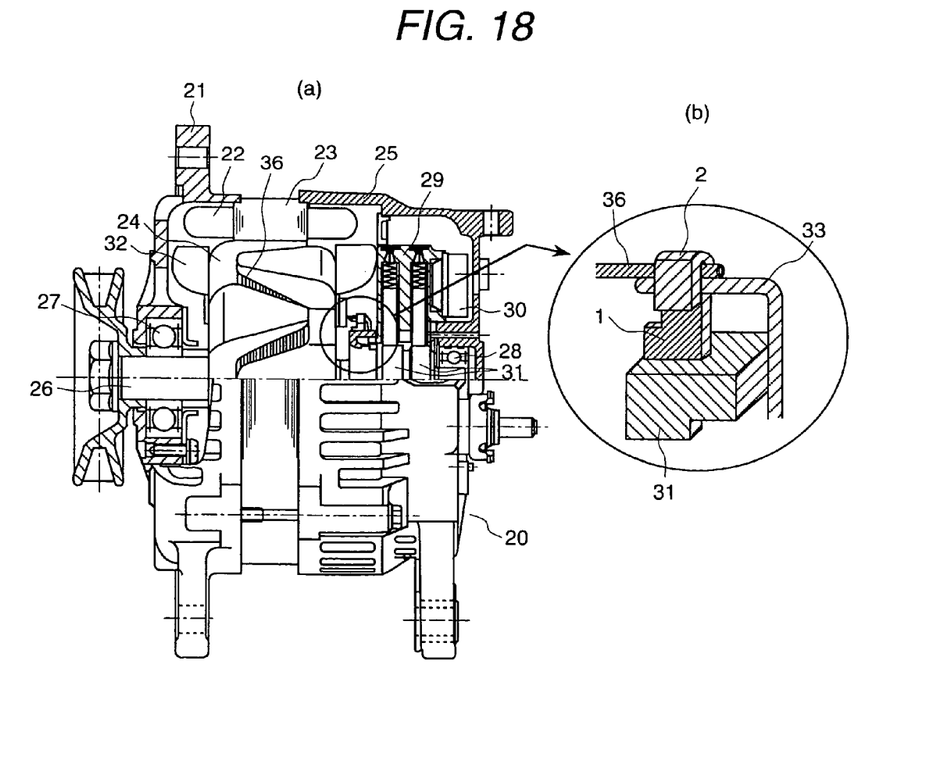
FIG. 18 is a side view of the alternating current generator for the rolling stock using the present invention and a magnified view of its connecting part.

In this embodiment, either of the embodiments 1 to 10 can be applied to the rolling stock alternating current generator 20 shown in FIG. 18, and specifically, this embodiment is an example of using the U-shaped connecting terminal. In the rolling stock alternating current generator 20, as shown in FIG. 18, the both ends of the magnetic field coil 36 made by winding the electric cable having the insulated coating are connected to the slip ring lead line 33 as the electrically conductive member 3 at the connecting terminal 2. As in the embodiment 9, a part of the connecting terminal 2 is mounted and fixed at the fixing resin 37 of the slip ring 31. In addition, as in the embodiment 2, the connecting terminal 2 has the junction support member 1 with 0.07 mm thickness phosphor copper braze (P 5%, Ag 15% and Cu 80% in weight fraction) on the inner surface of the U-shaped terminal plate. The connecting terminal 2 is made of copper, its thickness is 0.8 mm and its width is 5 mm, and the end part of the magnetic field coil 36 as the electric cable 5 having the insulated coating and the slip ring lead lie 33 as the electrically conductive member 3 are inserted in parallel into the connecting terminal 2. In addition, by applying the pressure and the electric current to the electrode with the resistance welder, the end part of the magnetic field coil 36 as the electric cable having the insulated coating and the slip ring lead line 33 as the electrically conductive member 3 are connected to the connecting terminal 2 with the junction support member 1.

Figure 19:
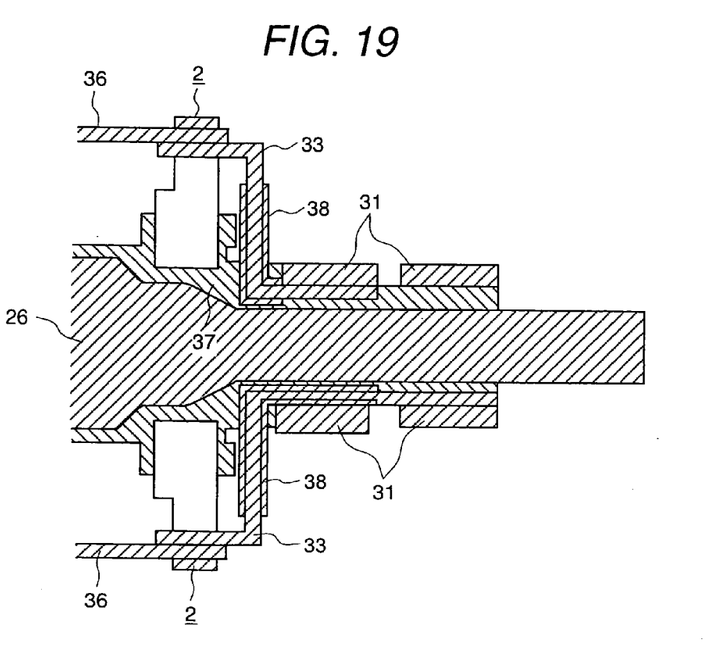
FIG. 19 is a cross-sectional view of the main connecting part of the connecting terminal shown in FIG. 18.

FIG. 19 shows a cross-sectional view illustrating a specific connecting structure of the connecting terminal 2 in the present invention. There are a couple of slip springs 31, and those are pressed into the fixing resin 37 together with the slip ring lead line 33, and then, pressed into the shaft 26 and fixed there finally. In the figure, the upper slip ring lead line 33 is connected to the inside slip ring 31, and the lower slip ring lead line 33 is connected to the outside slip ring 31, and its intermediate part has the insulated coating 38. In addition, in order to prevent the thermal interference into the fixing resin due to the heat generation when establishing the connecting structure in connecting between the end part of the magnetic field coil 36 and the slip ring lead line 33 as the electrically conductive member 3, the width of the connecting terminal 2 is made smaller than the width of its mount part at the fixing resin 37. And furthermore, the diameter of the shaft 26 increases as it goes in the longitudinal direction from the part for the slip ring 31 toward the part for the connecting terminal 2 and the part for the magnetic field coil winding 36, and thus, formed so as to be compliance with the press-in process of the fixing resin 37 into the shaft 26.

Figure 20:
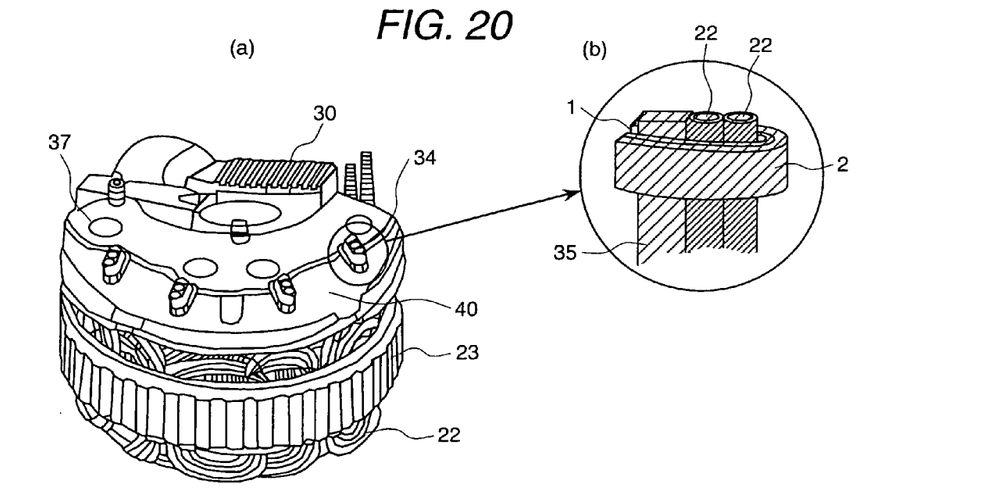
FIG. 20 is a perspective view illustrating the stator core of the alternating current generator for the rolling stock using the present invention, and a magnified view of the stator core connecting part.

FIG. 20 includes a perspective view of the stator core and a perspective view illustrating the connecting state of the connecting terminal. Diodes 37 are mounted in the Aluminum plate in the rectifier apparatus 34, and the individual terminal 35 is connected to the diode 37 and is formed by cutting the plate material in a rectangular shape. The connecting terminal 2 is covered by the resin cover as shown in FIG. 20. As shown in FIG. 20, the stator core includes the stator coil 22 formed by winding the electric cable 5 having the insulated coating and the terminal 35 of the rectifier apparatus 34, and using the U-shaped connecting terminal, the stator coil 22 and the terminal 35 are arranged in parallel inside the U-shaped connecting terminal. By pressing the U-shaped connecting terminal by the electrode of the resistance welder and applying the electric current, the generated heat establishes the connection of the stator coil 22 having the insulated coating and the terminal 35 to the connecting terminal 2. According to this method, it will be appreciated that the procedural step for removing the insulated coating of the electric cable having the insulated coating for the magnetic field coil 36 and the stator coil 22 can be omitted, and thus, the working manpower can be reduced. In addition, as the connecting structure is established metallurgically by using phosphor copper braze for the junction support member 1, the heat resistance and the reliability can be increased.

According to the above-mentioned embodiments, the following structure can be provided.

(1) A connection structure wherein
electric cables having an insulated coating and an electrically conductive member with a non-insulated coating are connected mutually through a connecting terminal having a junction support member to a side of said junction support member by applying an electric current, applying a heat and applying a pressure.

(2) A connecting structure wherein
an electric cable having an insulated coating and an electric cable with a non-insulated coating are connected to each other through a connecting terminal having a junction support member to a side of said junction support member by applying an electric current, applying a heat and applying a pressure.

(3) A connecting method comprising
a step for arranging electric cables having an insulated coating and an electrically conductive member with a non-insulated coating at a connecting terminal having a junction support member to a side of said junction support member; and
a step for connecting mutually said electric cables and said electrically conductive member with a non-insulated coating through said electrically conductive member with a non-insulated coating and said connecting terminal by applying an electric current, applying a heat and applying a pressure.

(4) A connecting method comprising
a step for arranging an electric cable having an insulated coating and an electric cable with a non-insulated coating at a connecting terminal having a junction support member to a side of said junction support member; and
a step for connecting said electric cable and said electric cable with a non-insulated coating through said electric cable with a non-insulated coating and said connecting terminal by applying an electric current, applying a heat and applying a pressure.

According to the present invention, as the metallic connection between the electric cable having the insulated coating and the electrically conductive member is established with the alloy layer of the connecting support member at the connecting terminal only by local heating, it will be appreciated that the connecting structure has a high heat resistance, an electric stability and a high reliability.

According to the present invention, as the electric cable having the insulated coating and the electrically conductive member can be connected metallically without removing the insulated coating of the electric cable having the insulated coating, it will be appreciated that the step before the connecting step can be removed. In addition, as the connecting state can be stabilized and the connection structure can be downsized, it will be appreciated that the connecting structure and method enabling to establish an excellent electric characteristic and a high strength reliability can be provided.

What is claimed is:
1. A connecting method, comprising the steps:
arranging side and side an electric cable having an insulated coating and an uninsulated electrically conductive member with a connecting terminal through a junction support member; and
connecting to each other said electric cable and said uninsulated electrically conductive member in a direction in which said electric cable and said uninsulated electrically conductive member with are not overlapped by applying an electric current, applying heat and applying pressure whereby when said electric current flows through said uninsulated electrically conductive member said heat is generated by said junction support member and said uninsulated electrically conductive member to soften and remove said insulating coating from said electric cable.

2. A connecting method according to claim 1, wherein said connecting terminal is a U-shaped connecting terminal or a ring shaped connecting terminal, said method including;
a connecting target member corresponding to individual connections for said electric cable having said insulated coating, wherein said uninsulated electrically conductive member is integrated in said connecting terminal; and connecting said connecting target member by applying an electric current, applying heat and applying pressure from both sides of a flat plate face of said connecting terminal.

3. A connecting method according to claim 1, wherein said connecting terminal is a U-shaped connecting terminal, said method including;

a connecting target member corresponding to individual connections for said electric cable having said insulated coating, wherein said uninsulated electrically conductive member, and said electric cable having said insulated coating are integrated in said connecting terminal;

arranging said uninsulated electrically conductive member or said electric cable having said insulated coating inside an open side of said U-shaped connecting terminal; and connecting said uninsulated electrically conductive member or said electric cable having said insulated coating by applying an electric current, apply heat and applying pressure connected from both sides of a flat pate face of said U-shaped connecting terminal.

4. A connecting method comprising the steps:

arranging side by side an electric cable having an insulated coating and an uninsulated electric cable with a connecting terminal through a junction support member; and connecting to each other said electric cable having said insulated coating and said uninsulated electric cable in a direction in which said electric cable having said insulated coating and said uninsulated electric cable are not overlapped by applying an electric current, applying heat and applying pressure whereby heat generated by said junction support member and said uninsulated electric cable in response said electric current through said electric cable having said insulating coating removes said insulating coating.

* * * * *